Dec. 3, 1963 W. L. ZINGERY 3,112,651
HEAT DISTRIBUTOR
Filed Nov. 16, 1960
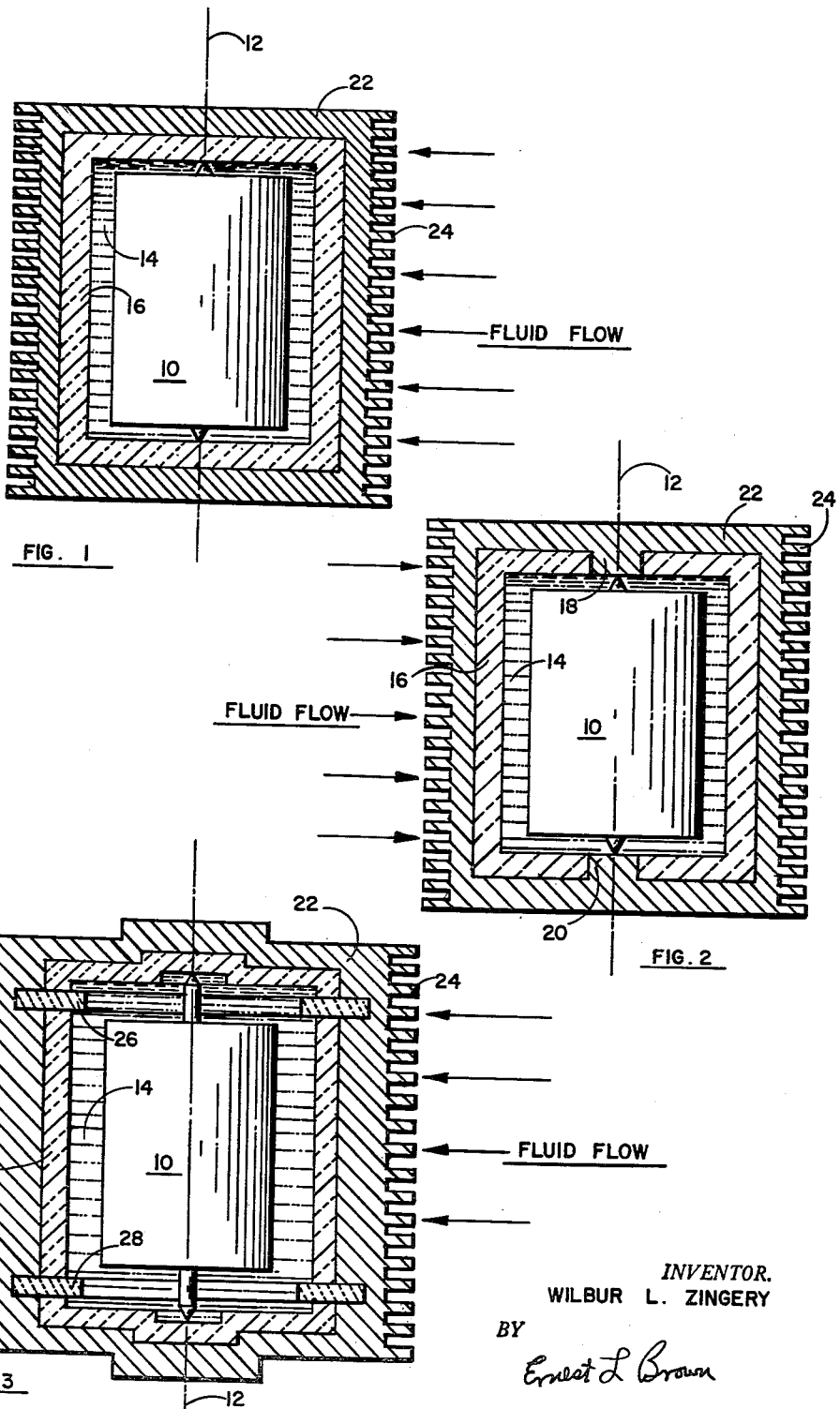
INVENTOR.
WILBUR L. ZINGERY
BY
Ernest L. Brown
ATTORNEY United States Patent Office 3,112,651
Patented Dec. 3, 1963

3,112,651
HEAT DISTRIBUTOR
Wilbur L. Zingery, Long Beach, Calif., assignor to
North American Aviation, Inc.
Filed Nov. 16, 1960, Ser. No. 69,773
6 Claims. (Cl. 74—5)

This invention pertains to means for distributing the heat around an enclosed body, and more particularly around a gyroscopic instrument or the like, to create a predetermined temperature pattern within the heat distributor.

In the precision gyroscope art, the precision of the gyroscope is reduced if mass unbalance occurs. One of the causes of mass unbalance is a difference in temperature across any diameter of the gyroscope.

If the gyroscope is supported by a flotation fluid, convection of the flotation fluid applies torque to the supported gyroscope which reduces the precision of the gyroscope. Convection is caused by a difference in temperature across any diameter of the gyroscope.

It would seem that one way of reducing the temperature difference across a diameter of a gyroscope would be to surround the gyroscope with air, or other fluid, which has a constant temperature. Usually, however, this is not feasible.

Frequently the gyroscope is electrically driven which causes the gyroscope itself to be a heat source. To remove heat from the gyroscope, thereby to prevent the gyroscope from overheating, frequently requires the use of a fluid flow such as an air blast.

If a flow of fluid is utilized, the fluid flow over an instrument causes an unbalance in the ability of the air film to exchange heat. Across a particular diameter of the instrument, for example parallel to the airflow, the air film exchanges more heat on the side adjacent the air blast than it does on an opposite end of the diameter away from the air blast. The unbalance in air film heat exchange causes a different thermal resistance on each side of the instrument, thereby causing an asymmetric heat flow in the instrument.

To avoid ambiguity in this specification, the following definitions are in order. The thermal resistance of a device is defined as the ratio of the temperature difference across the device to the heat flow caused by said temperature difference. Diametral temperature difference is defined as the difference in temperature between two points on the same diameter, at equal radius from the center, and upon opposite sides of the center.

Asymmetric heat flow in the region of the gyroscopic instrument causes a diametral temperature difference. In the present state of the art, diametral temperature differences of less than 0.01 degrees F. are required. It is expected that in the future even stricter requirements will prevail.

Without a heat distributor, in accordance with this invention, a diametral temperature difference of several degrees is frequently observed.

Applicant's first approach to the solution of the problem of a high diametral temperature difference is to lower the thermal resistance of the air film by attaching fins to the outer periphery of a housing enclosing the floated gyroscope.

If the diametral temperature difference across the exterior of the housing which encloses the gyroscope is not sufficiently small, this invention contemplates the use of a heat insulating shield having a high thermal resistance relative to the thermal resistance of the device it encloses. The heat insulating shield is symmetrical about the output axis of the gyroscope, the interior thereof forming a surface of revolution about said output axis.

To further decrease the diametral temperature difference, this invention contemplates the utilization of means having low thermal resistance penetrating through the heat insulating shield to the external housing and being positioned along the axis of symmetry of the heat insulating shield. The radius of the low thermal resistance means is preferably very small, i.e., only large enough to remove the desired quantity of heat, to prevent overheating, from the gyroscopic instrument to the external low resistance housing.

An alternative embodiment of the device of this invention utilizes an annular member, having a thermal resistance which is intermediate the thermal resistance of the gyroscope case, internal to the heat insulating shield, and the thermal resistance of the heat insulating shield, itself. The annular member is symmetrically disposed about the axis of symmetry of the heat insulating shield and extends through the heat insulating shield to conduct heat from the gyroscope to the external housing.

It is therefore an object of this invention to generate a predetermined temperature pattern.

It is another object of this invention to shield a low thermal resistance means relative to an external low thermal resistance means by symmetrically enclosing the first low resistance means with high thermal resistance means, and to channel heat along a predetermined axis of symmetry from the enclosed low thermal resistance means to the external low thermal resistance means.

It is another object of this invention to shield a low resistance means from an external low resistance means by high thermal resistance means, symmetrically disposed about a predetermined axis, and by means having an intermediate thermal resistance, symmetrically disposed about said predetermined axis and positioned in said high resistance means to carry heat to said external low resistance means.

It is also an object of this invention to reduce mass unbalance of a gyroscopic instrument by reducing the diametral temperature difference on the surface of said instrument.

It is an object of this invention to reduce convection torque applied by the flotation fluid to flotation gyroscopes.

It is a more particular object of this invention to provide a novel heat distributor which is adapted to be utilized in connection with gyroscopic structures, and the like, to create a predetermined temperature pattern.

These and other objects of the invention will become apparent from the following description taken in connection with the accompanying drawings, in which:

FIG. 1 is a view partially in section, showing a first embodiment of this invention;

FIG. 2 is a view, partially in section, showing a preferred embodiment of this invention; and FIG. 3 is a view, partially in section, showing a third embodiment of this invention.

In FIG. 1, a gyroscopic case 10 is pivoted for at least limited rotation about axis 12. Details of a gyroscopic instrument have been omitted because they are only incidental to the invention. Usually the case 10 of a gyroscopic instrument is fabricated of metallic material which has a low thermal resistance. In any event, regardless of the material of the case of gyroscope 10, the thermal impedance of the case of gyroscope 10 is defined as a low thermal impedance.

The region 14 immediately surrounding case 10 is usually filled with a flotation fluid which is adapted to support most of the weight of case 10 and its contents. Usually the amount of fluid within space 14 is very small and the clearance between case 10 and its surrounding structure is also very small so that the thermal resistance of the fluid is insignificant. Axis 12 is usually the output axis of the gyroscope within casing 10.

A high resistance enclosure 16 symmetrically encloses case 10 to form a surface of revolution about axis 12. Heat insulating shield 16 could—for example—be made of wool, fiberglass, and the like or it might be a vacuum.

External housing 22 utilizes a plurality of fins 24 which are, preferably, parallel to the direction of applied cooling fluid flow. Cooling fluid (which may be liquid or gas) is supplied by a pump (not shown). The use of fins 24 lowers the external resistance of the air films surrounding housing 22.

In FIG. 2, a pair of low thermal resistance means 18 and 20 (usually of metal) penetrate through insulating shield 16 along axis 12 to provide a low resistance path for the flow of heat from gyroscope case 10 to external housing 22. Low thermal resistance means 18 and 20 are symmetrically disposed about the axis 12, and are preferably circularly cylindrical. It is to be noted that the radial size of low resistance members 18 and 20 may, if desired, be different. In general, the smaller the radius of the members 18 and 20, the more uniform is the temperature within shield 16 to cause the diametral temperature difference to be decreased. Members 18 and 20 must be only large enough to carry the required amount of heat to prevent overheating.

In FIG. 3 is shown a low thermal resistance case of a gyroscope 10 mounted for at least limited rotation about axis 12, a high thermal resistance heat insulating shield 16 enclosing low resistance means 10 and symmetrical about the axis 12. High resistance shield 16 is spaced from case 10 by at least a small space 14, usually filled with flotation fluid and having a low thermal resistance. Surrounding housing 22 has a low resistance and is adapted to receive heat.

Positioned in heat insulating shield 16 is a pair of axially spaced-apart annular members 26 and 28, symmetrically disposed at a predetermined inner radius about axis 12, each having a thermal resistance intermediate the resistance of heat shield 16 and the resistance gyroscope case 10. Members 26 and 28 are preferably positioned at extreme ends of heat insulating shield 16 to cause the heat flow to have primarily an axial component within the region of case 10. The flow of heat in a radial direction becomes appreciable only in the region of members 26 and 28. By making the thermal resistance of members 26 and 28 appreciably high relative to the thermal resistance of case 10, diametral temperature difference on the exterior side of members 26 and 28 cause only insignificant diametral temperature differences on the interiors thereof to cause heat to flow symmetrically outward around the inner periphery of members 26 and 28. By making the thermal resistance of members 26 and 28 relatively low compared to the thermal resistance of member 16, the majority of heat is channeled axially toward members 26 and 28, and only a negligible amount of heat flows through the walls of members 16. The area of members 26 and 28 internal of members 16 are preferably as small as possible to remove only the required amount of heat to prevent deterioration of the gyroscopic instrument within case 10.

If—for example—case 10 is metallic, external housing 22 is metallic, and heat insulating shield 16 is glass wool, an example of material which would be suitable for members 26 and 28 is a ceramic or metal ceramic combination.

In a preferred embodiment of this invention, the thermal resistance of member 26 and 28 preferably is at least 10 times the thermal resistance of member 10 and the thermal resistance of heat insulating shield 16 preferably is at least 10 times the resistance of members 26 and 28.

It is preferable to use fins to reduce the diametral temperature difference on the exterior of housing 22. It is apparent that if the diametral temperature difference is reduced on the exterior of housing 22 that it is also reduced on the interior of heat shield 16 in the region of flotation fluid 14.

In operation, fins 24 of housing 22 reduce the thermal resistance of the fluid or air film adjacent housing 22 to cause the impedance of the air film to be insignificant compared to the resistance of the high resistance member 16.

Because the thermal resistance of opposing sides of case 10 are substantially the same, and because the resistance of the air film on either side of housing 22 is small compared to the impedance of member 16, substantially equal qualities of heat flow in opposing diametral directions from case 10 thereby decreasing the diametral temperature difference in region 14.

In FIG. 2, by making the thermal resistance of low resistance means 18 and 20 very small compared to the thermal resistance of heat insulating barrier 16, substantially all of the heat is caused to flow through means 18 and 20 into housing 22. By making low resistance means 18 and 20 as small as possible, the heat in the region of fluid 14 is caused to travel substantially axially to cause a balance flow of heat so that the diametral temperature difference approaches zero.

In FIG. 3, because the thermal resistance of heat barrier 16 is very high relative to the thermal resistance of annular members 26 and 28, heat is caused to flow axially until it reaches the region of members 26 and 28. Because the thermal resistance across a diameter of gyroscope case 10 is very low compared to the thermal resistance of annular member 26 the resistance of member 26 controls the flow of heat to cause it to be substantially uniform in the region of flotation fluid 14, thereby decreasing the diametral temperature difference. Further, a similar situation prevails in annular member 28.

Thus, the device of this invention is a heat distributor that is adapted to reduce substantially to zero the diametral temperature difference in the region of the flotation fluid of a gyroscopic instrument while allowing the internal temperature to be maintained below some maximum value.

Although the invention has been described and illustrated in detail, it is to be understood that the same is by way of illustration and example only and is not to be taken by way of limitation, the spirit and scope of this invention being limited only by the terms of the appended claims.

I claim:

1. In combination: symmetrical gyroscopic means, said gyroscopic means having a case that has a low thermal resistance and which is symmetrical about a predetermined output axis of said gyroscopic means; a heat insulating shield having a high thermal resistance, enclosing said low thermal resistance case, and symmetrically disposed about said axis to form an internal surface which is a surface of revolution about said axis; external housing having low thermal resistance surrounding said heat insulating shield; means having an intermediate thermal resistance which is substantially less than the thermal resistance of said insulating shield and substantially more than the thermal resistance of said gyroscopic case and having an annular shaped inner surface; said intermediate resistance means having an internal annular surface, positioned symmetrically relative to said output axis, and said intermediate resistance means penetrating through said insulating shield to carry heat to said external housing means.

2. A device as recited in claim 1 and further comprising fins on the periphery of said external housing means and fluid flow means contacting said enclosing housing and said fins to remove heat therefrom in a symmetrical pattern.

3. In combination: a symmetrical heat source, including means having a low thermal resistance; a heat insulating shield, having a thermal resistance which is at least 10 times as great as said low thermal resistance, symmetrically disposed relative to a predetermined axis and at least partially enclosing said heat source; a second low thermal resistance enclosing structure enclosing said insulating shield, having fins about its periphery immersed in a moving fluid; and a third low thermal resistance means, penetrating through said insulating shield along the axis of symmetry of said shield to conduct heat from said heat source to said enclosing structure.

4. A device as recited in claim 3 wherein said last named low thermal resistance means is symmetrical about said axis of symmetry.

5. A device as recited in claim 3 in which said heat insulating shield completely encloses said heat source and has heat removing fins on its outer periphery.

6. In combination: a first symmetrical low thermal resistance member; a symmetrical high thermal resistance heat insulating shield, symmetrically enclosing said low resistance member; a second low thermal resistance member symmetrically disposed about said insulating shield; and a third low thermal resistance means positioned on the axis of symmetry of said heat insulating shield and penetrating therethrough to contact said second low thermal resistance member.

References Cited in the file of this patent

UNITED STATES PATENTS

| | | |
|---|---|---|
| 2,711,882 | Narbutovskih | June 28, 1955 |
| 2,768,046 | Evans | Oct. 23, 1956 |
| 2,960,873 | Lundberg | Nov. 22, 1960 |
| 3,044,309 | Buchhold | July 17, 1962 |

FOREIGN PATENTS

| | | |
|---|---|---|
| 182,506 | Great Britain | July 3, 1922 |